(12) United States Patent
Shibata et al.

(10) Patent No.: US 10,286,922 B2
(45) Date of Patent: May 14, 2019

(54) INFORMATION PROVISION DEVICE

(71) Applicant: DENSO CORPORATION, Kariya, Aichi-pref. (JP)

(72) Inventors: Syunsuke Shibata, Nishio (JP); Norio Sanma, Nishio (JP); Motoki Tachiiri, Nishio (JP); Sei Iguchi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/564,596

(22) PCT Filed: Mar. 23, 2016

(86) PCT No.: PCT/JP2016/001664
§ 371 (c)(1),
(2) Date: Oct. 5, 2017

(87) PCT Pub. No.: WO2016/163085
PCT Pub. Date: Oct. 13, 2016

(65) Prior Publication Data
US 2018/0079430 A1 Mar. 22, 2018

(30) Foreign Application Priority Data
Apr. 7, 2015 (JP) .................................. 2015-78670

(51) Int. Cl.
*B60W 50/16* (2012.01)
*B62D 1/04* (2006.01)
(Continued)

(52) U.S. Cl.
CPC ............ *B60W 50/16* (2013.01); *B62D 1/046* (2013.01); *B62D 15/025* (2013.01); *B62D 15/029* (2013.01); *G08G 1/167* (2013.01)

(58) Field of Classification Search
CPC ........ B60W 50/16; B62D 1/046; B62D 15/025
(Continued)

(56) References Cited

U.S. PATENT DOCUMENTS

| | | | |
|---|---|---|---|
| 2009/0073112 A1* | 3/2009 | Basson | G06F 3/016 345/156 |
| 2014/0062872 A1 | 3/2014 | Tanaka | |
| 2014/0244115 A1 | 8/2014 | Sanma et al. | |

FOREIGN PATENT DOCUMENTS

| | | | | |
|---|---|---|---|---|
| JP | 2014-046867 A | 3/2014 | | |
| JP | 2014-164466 A | 9/2014 | | |
| WO | WO-2015178303 A1 * | 11/2015 | ............. | B60K 35/00 |

* cited by examiner

*Primary Examiner* — Isaac G Smith
(74) *Attorney, Agent, or Firm* — Knobbe, Martens, Olson & Bear, LLP

(57) ABSTRACT

An information provision device includes a left vibrator disposed at left portion of a vehicle steering wheel and a right vibrator disposed at right portion of the vehicle steering wheel, a control unit vibrating the vibrators under a predetermined pattern with varying intensity, and a pattern setting unit. The pattern setting unit sets a right-turn related pattern when right-turn related information is provided and sets a left-turn related pattern when left-turn related information is provided. The right-turn related pattern includes at least a pattern in which a left vibration state, a right-and-left vibration state, and a right vibration state shift in described order. The left-turn related pattern includes at least a pattern in which the right vibration state, the right-and-left vibration state, and the left vibration state shift in described order.

10 Claims, 6 Drawing Sheets

(51) Int. Cl.
*B62D 15/02* (2006.01)
*G08G 1/16* (2006.01)

(58) Field of Classification Search
USPC .................................................. 701/36, 41
See application file for complete search history.

(RIGHT-TURN PATTERN)

(LEFT-TURN PATTERN)

(RIGHT-ROTATION PATTERN)

(LEFT-ROTATION PATTERN)

(ACCELERATION AND DECELERATION PATTERN)

(ACCELERATION PATTERN)

(DECELERATION PATTERN)

INFORMATION PROVISION DEVICE

CROSS REFERENCE TO RELATED APPLICATION

This application is based on Japanese Patent Application No. 2015-078670 filed on Apr. 7, 2015, the disclosure of which is incorporated herein by reference.

TECHNICAL FIELD

The present disclosure relates to an information provision device providing information using a vibration of a vibrator attached to a steering wheel of a vehicle.

BACKGROUND ART

An information provision device in the related art provides a driver of a vehicle with various types of information, such as attention calling information, by vibrating a vibrator disposed at a steering wheel of the vehicle. In an information provision device described in, for example, Patent Literature 1, multiple vibrators (left vibrators) are disposed at a left portion of a steering wheel and multiple vibrators (right vibrators) are disposed at a right portion of the steering wheel. When the driver is called upon to make a right-rotation operation on the steering wheel, the multiple left vibrators are vibrated sequentially from a lowermost vibrator, followed by the multiple right vibratos which are vibrated sequentially from an uppermost vibrator. The driver can thus know by tactile sensation that the driver is called upon to make a right-rotation operation to the steering wheel.

PRIOR ART LITERATURE

Patent Literature

Patent Literature 1: JP 2014464466 A

SUMMARY OF INVENTION

The device in the related art configured as above requires multiple vibrators on each of right and left sides of the steering wheel. That is, at least four vibrates are required.

In view of the foregoing circumstances, it is an object of the present disclosure to provide an information provision device enabling a user to comprehend provided information by tactile sense with fewer vibrators.

According to an aspect of the present disclosure, an information provision device includes: a left vibrator disposed at a left portion of a steering wheel of a vehicle when viewed from a front of the steering wheel; a right vibrator disposed at a right portion of the steering wheel of the vehicle when viewed from the front of the steering wheel; a control unit controlling the left vibrator and the right vibrator to vibrate at a vibration intensity which varies according to a predetermined pattern; and a pattern setting unit. The pattern setting unit sets, as the predetermined pattern, a right-turn related pattern when right-turn related information indicating information related to a right turn of the vehicle is provided to a user. The pattern setting unit sets, as the predetermined pattern, a left-turn related pattern when left-turn related information indicating information related to a left turn of the vehicle is provided to the user. A vibration state in which a vibration intensity of the left vibrator is equal to or higher than a predetermined value and a vibration intensity of the right vibrator is lower than the predetermined value or a vibration of the right vibrator is stopped is defined as a left vibration state. A vibration state in which the vibration intensity of each of the left vibrator and the right vibrator is equal to or higher than the predetermined value is defined as a right-and-left vibration state. A vibration state in which the vibration intensity of the right vibrator is equal to or higher than the predetermined value and the vibration intensity of the left vibrator is lower than the predetermined value or a vibration of the left vibrator is stopped is defined as a right vibration state. The right-turn related pattern includes at least a pattern in which the vibration state of each of the left vibrator and the right vibrator shifts in order of the left vibration state, the right-and-left vibration state, and the right vibration state. The left-turn related pattern includes at least a pattern in which the vibration state of each of the left vibrator and the right vibrator shifts in order of the right vibration state, the right-and-left vibration state, and the left vibration state.

The information provision device configured as above enables the user to comprehend provided information by tactile sense with fewer vibrators.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

Hereinafter, embodiments for carrying out the present disclosure will be described with reference to the drawings. In respective embodiments below, portions corresponding to matters described in any preceding embodiment are labeled with same reference symbols and a description of such portions will not be repeated where appropriate. In respective embodiments below, when only a part of a configuration is described, a description of the configuration in any preceding embodiment is applicable to a rest of the configuration.

First Embodiment

Figure 1:
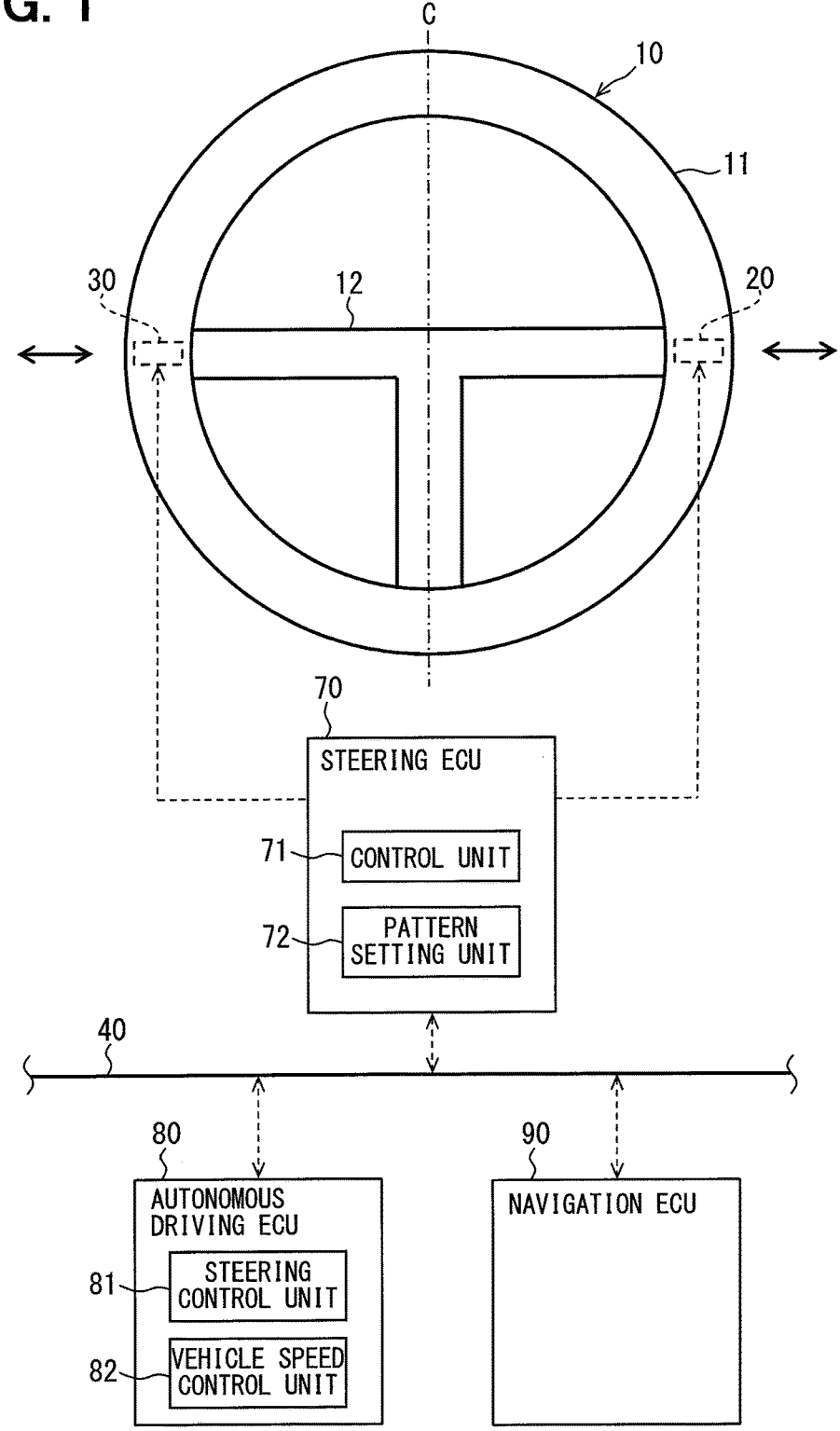
FIG. 1 is an electrical block diagram of an information provision device according to a first embodiment of the present disclosure.

A steering wheel 10 shown in FIG. 1 is viewed from a front of the steering wheel 10 in a vehicle compartment. The steering wheel is used to control a traveling direction of a vehicle. The steering wheel 10 includes a wheel 11 extending in a circular shape and a support unit 12 supporting an inner peripheral side of the wheel 11. A left vibrator 30 and a right vibrator 20 are disposed inside the wheel 11. The vibrators 20 and 30 each has a vibration element which vibrates in a predetermined direction (direction indicated by arrows in the drawing) upon supply of electrical power.

FIG. 1 shows the steering wheel 10 at a rotational position while the vehicle travels straight ahead. An alternate long and short dash line in the drawing indicates a center line C passing a rotation center and extending in a top-bottom direction in reference to the steering wheel 10 viewed from front of the steering wheel when the vehicle travels straight ahead. The left vibrator 30 is attached to the wheel 11 at a portion on a left side of the center line C in reference to the steering wheel 10 at the rotational position when the vehicle travels straight ahead. The right vibrator 20 is attached to the wheel 11 at a portion on a right side of the center line C in reference to the steering wheel 10 at the rotational position when the vehicle travels straight ahead. The predetermined direction (vibration direction) in which the vibrators 20 and 30 vibrate coincides with a vehicle right-left direction in reference to the steering wheel 10 at the rotational position when the vehicle travels straight ahead.

When the vibrators 20 and 30 vibrate, vibrations propagate to hands of a driver holding the wheel 11. It is anticipated that a vibration of the right vibrator 20 chiefly propagates to a right hand of the driver and a vibration of the left vibrator 30 chiefly propagates to a left hand of the driver. Vibrations of the vibrators 20 and 30 are controlled by an electronic control unit (steering ECU 70) equipped to the vehicle. The steering ECU 70 is connected to a communication line 40 installed to the vehicle. Other electronic control units, for example, an autonomous driving ECU 80 and a navigation ECU 90 are also connected to the communication line 40. The electronic control units connected with one another are allowed to communicate with one another via a local area network.

The autonomous driving ECU 80 performs an autonomous driving control of the vehicle. For example, the autonomous driving ECU 80 performs an autonomous steering control to autonomously control a traveling direction by operating the steering wheel 10 autonomously. The autonomous driving ECU 80 also performs an autonomous vehicle speed control to autonomously control a traveling speed by autonomously controlling operations of a braking device and a traveling drive source of the vehicle, such as an internal combustion engine or an electric motor. The autonomous driving ECU 80 during the autonomous steering control provides a steering control unit 81 which autonomously controls a steering angle of the steering wheel 10. The autonomous driving ECU 80 during the autonomous vehicle speed control provides a vehicle speed control unit 82 which autonomously controls a vehicle speed.

The navigation ECU 90 controls an unillustrated display device to display information on a present location of the vehicle, map information, information on a route to a destination, and so on. The navigation ECU 90 also controls operations of unillustrated speaker and display device (also known as turn-by-turn control) to output an audio guidance informing a suitable route to travel to the destination immediately before an intersection or a turning point along the traveling road according to the information on the present location, the information on the guidance route, and so on.

The steering ECU 70 includes a control unit 71 which controls the vibrators 20 and 30 to vibrate at an intensity varied according to a predetermined pattern by controlling electrical power supplied to the vibration elements of the respective vibrators 20 and 30.

Figure 2:
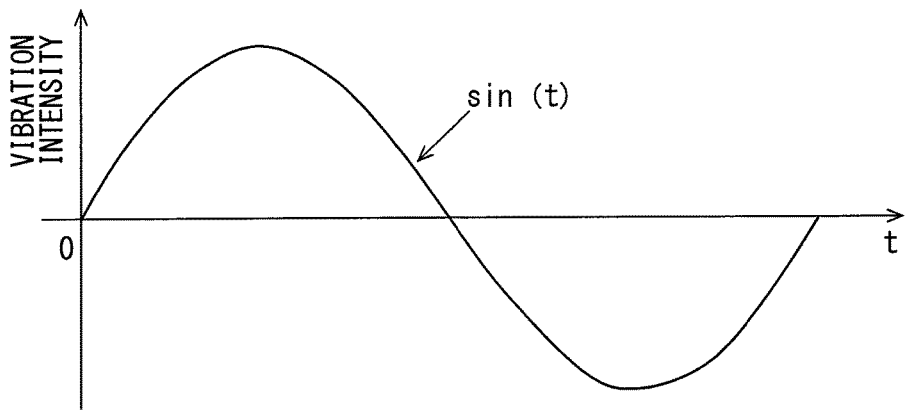
FIG. 2 is a view showing a long-period component of a vibration waveform.
Figure 3:
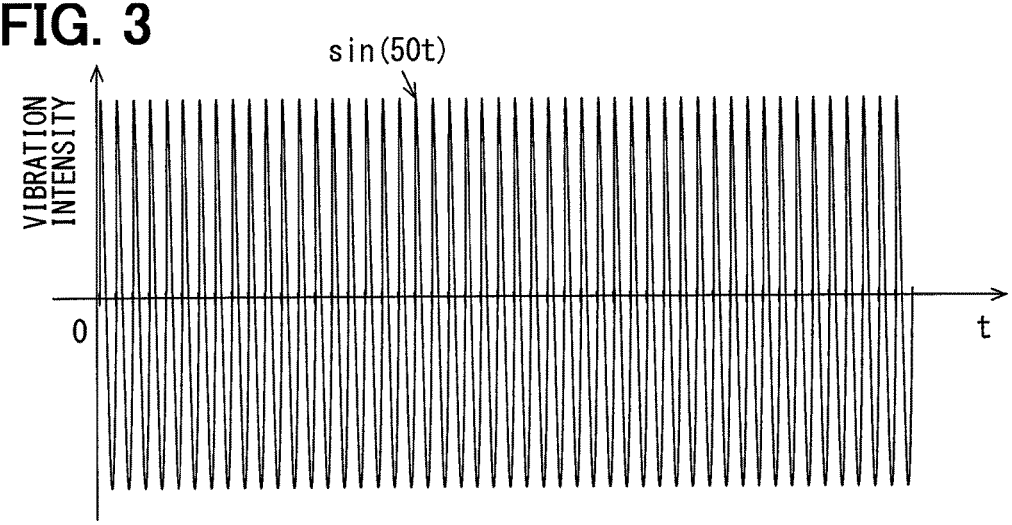
FIG. 3 is a view showing a short-period component of a vibration waveform.
Figure 4:
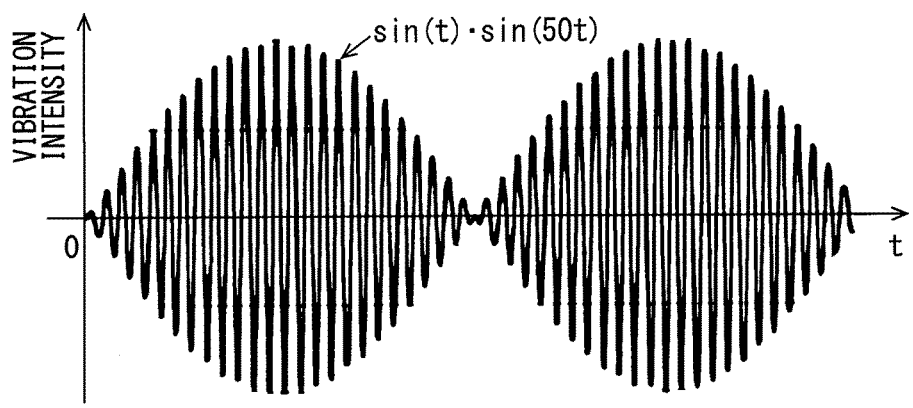
FIG. 4 is a view of a vibration waveform obtained by superimposing the long-period component shown in FIG. 2 and the short-period component shown in FIG. 3.

The following will describe vibration waveforms at varying intensity of the vibrators 20 and 30 in detail using FIG. 2, FIG. 3, and FIG. 4.

In the drawings, an abscissa is used for an elapsed time and an ordinate is used for amplitude (vibration intensity) of the vibration element. A plus side (upper side) of the ordinate is used for a rightward movement quantity of the vibration element and a minus side (lower side) of the ordinate is used for a leftward movement quantity of the vibration element. A waveform shown in FIG. 2 represents $\sin(t)$, a waveform shown in FIG. 3 represents $\sin(50t)$, and a waveform shown in FIG. 4 represents $\sin(t)\cdot\sin(50t)$. A vibration waveform shown in FIG. 4 corresponds to a waveform of an actual vibration of the vibration element. The vibration waveform is obtained by superimposing a waveform of a long-period component shown in FIG. 2 and a waveform of a short-period component shown in FIG. 3. It should be noted that the long-period component and the short-period component have the same vibration intensity.

Hence, vibration intensity of the vibration waveform increases and decreases at a period of the long-period component shown in FIG. 2 while the vibration waveform is vibrating at a vibration frequency of the short-period component shown in FIG. 3. In other words, the vibration waveform gradually increases in amplitude (vibration intensity) and the vibration intensity reaches a maximum at one fourth of the period of the long-period component. Subsequently, the vibration intensity decreases gradually and decreases to 0 at half the period of the long-period component. Subsequently, the vibration intensity again increases gradually and decreases gradually. In short, the vibration intensity varies to pulsate twice by increasing and decreasing and again increasing and decreasing. The above has described a vibration waveform varied in vibration intensity from the vibrators 20 and 30 controlled by the control unit 71.

The steering ECU 70 also includes a pattern setting unit 72 which sets a vibration pattern. When information on a right turn to be taken by the vehicle (right-turn related information) is provided to a user, the pattern setting unit 72 sets the vibration pattern corresponding to the right-turn. When information on a left turn (left-turn related information) is provided to the user, the pattern setting unit 72 sets the vibration pattern corresponding to the left turn.

As specific examples of the right-turn related information and the left-turn related information, advance information giving a prior notice that the steering wheel 10 is to be rotated autonomously immediately before the steering control portion 81 autonomously rotates the steering wheel 10 may be provided. As another example of the right-turn related information and the left-turn related information, information on a right or left turn notified by the turn-by-turn control may be provided. The advance information includes information (right-rotation information) giving a prior notice to the user that the steering wheel 10 is to be rotated clockwise and information (left-rotation information) giving a prior notice to the user that the steering wheel 10 is to be rotated counterclockwise.

In the following description, a vibration pattern set when the right-turn information of the turn-by-turn control is provided is referred to as a right-turn pattern (see FIG. 5), and a vibration pattern set when the left-turn information of the turn-by-turn control is provided is referred to as a left-turn pattern (see FIG. 6). A vibration pattern set when the right-rotation information of the steering control unit 81 is provided is referred to as a right-rotation pattern (see FIG. 7), and a vibration pattern set when the left-rotation information of the steering control unit 81 is provided is referred to as a left-rotation pattern (see FIG. 8). The left-turn pattern and the left-rotation pattern are also referred to as a left-turn related pattern. The right-turn pattern and the right-rotation pattern are also referred to as a right-turn related pattern.

Figure 9:
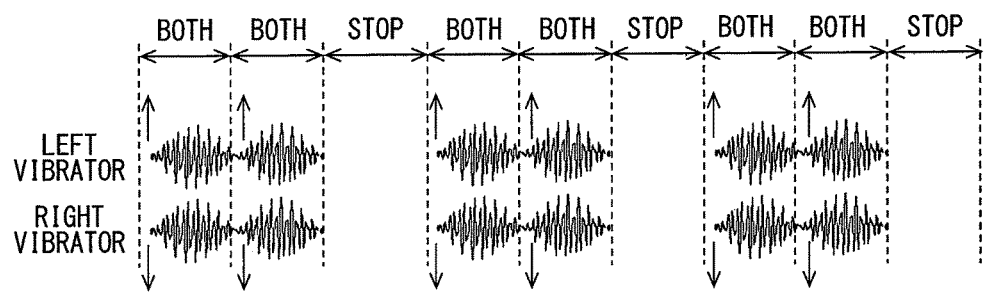
FIG. 9 is a view used to describe an acceleration and deceleration pattern of the first embodiment.

The information provision device of the present embodiment also provides the user with acceleration and deceleration information giving a prior notice that the vehicle is autonomously accelerated or decelerated immediately before the vehicle speed control unit 82 autonomously accelerates or decelerates the vehicle using vibration in an acceleration pattern or in deceleration pattern (see FIG. 9). That is, the pattern setting unit 72 sets the vibration pattern according to the right-rotation information and the right-turn information each referred to also as the right-turn related information, the left-rotation information and the left-turn information each referred to also as the left-turn related information, and the acceleration and deceleration information.

The respective vibration patterns shown in FIG. 5 through FIG. 9 will now be described in detail.

In each figure of FIG. 5 through FIG. 9, a vibration waveform on upper side is a vibration waveform of the left vibrator 30, and a vibration waveform on lower side is a vibration waveform of the right vibrator 20. The vibration waveforms are same as the vibration waveform shown in FIG. 4, and show an outcome when a vibration of sin(t)·sin (50) pulsating twice is repeated more than once (three times) at a predetermined interval. In the vibration patterns shown in FIG. 5 through FIG. 8, twice vibration shown in FIG. 4 is shifted by half of the period between the left vibrator 30 and the right vibrator 20. In the vibration pattern shown in FIG. 9, twice vibration shown in FIG. 4 is synchronized between the left vibrator 30 and the right vibrator 20. That is, when a right-and-left vibration state described below is started, amplitude starts to increase and starts to decrease in synchronized manner in the left vibrator 30 and the right vibrator 20.

In the following description, a state in which the left vibrator 30 is vibrated at vibration intensity as high as or higher than a predetermined value while the right vibrator 20 is in vibration stopped state is referred to as a left vibration state. A state in which both of the left vibrator 30 and the right vibrator 20 are vibrated at vibration intensity as high as or higher than the predetermined value is referred to as a right-and-left vibration state. A state in which the right vibrator 20 is vibrated at vibration intensity as high as or higher than the predetermined value while the left vibrator 30 is in vibration stopped state is referred to as a right vibration state. For example, referring to FIG. 5 through FIG. 9, a period indicated by an arrow attached with "LEFT" is a period of the left vibration state, a period indicated by an arrow attached with "RIGHT" is a period of the right vibration state, and a period indicated by an arrow attached with "BOTH" is a period of the right-and-left vibration state. A period indicated by an arrow attached with "STOP" is a period of a right-and-left stopped state in which both of the left vibrator 30 and the right vibrator 20 are in vibration stopped state.

Figure 5:
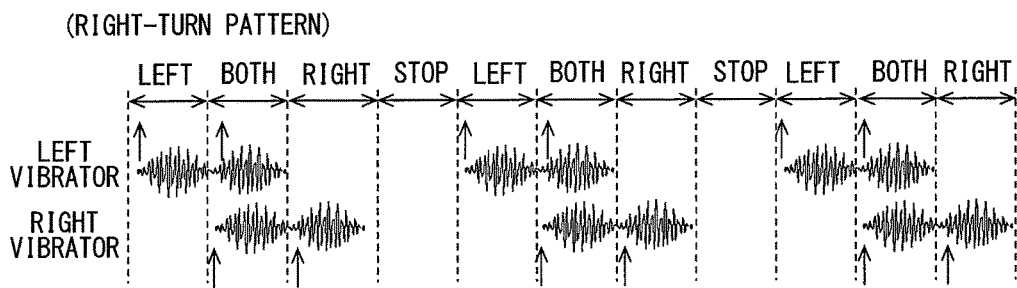
FIG. 5 is a view used to describe a right-turn pattern of the first embodiment.
Figure 6:
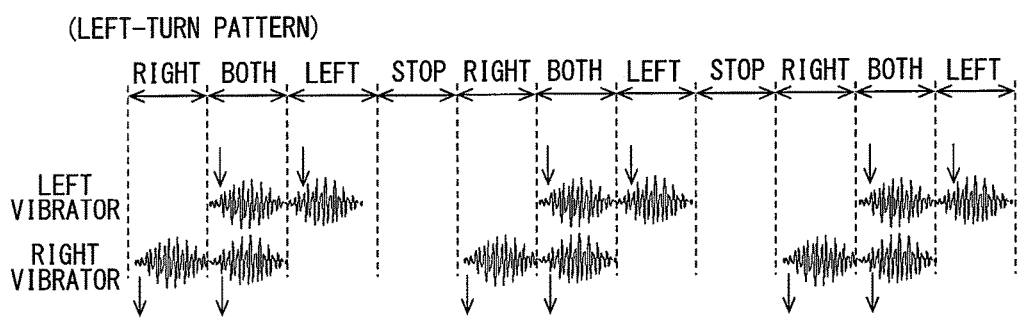
FIG. 6 is a view used to describe a left-turn pattern of the first embodiment.
Figure 7:
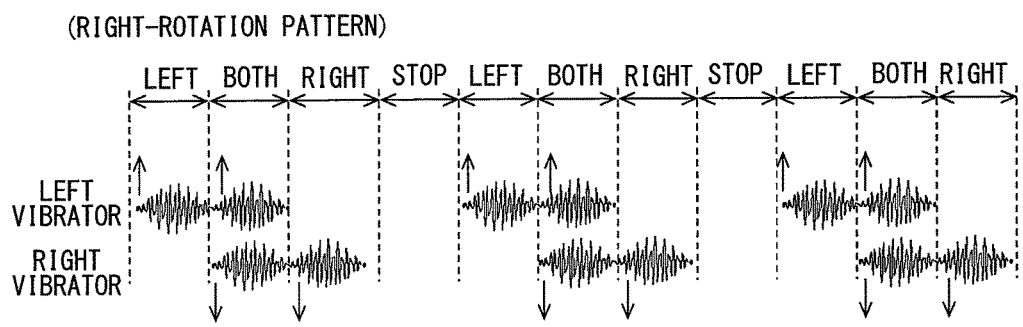
FIG. 7 is a view used to describe a right-rotation pattern of the first embodiment.
Figure 8:
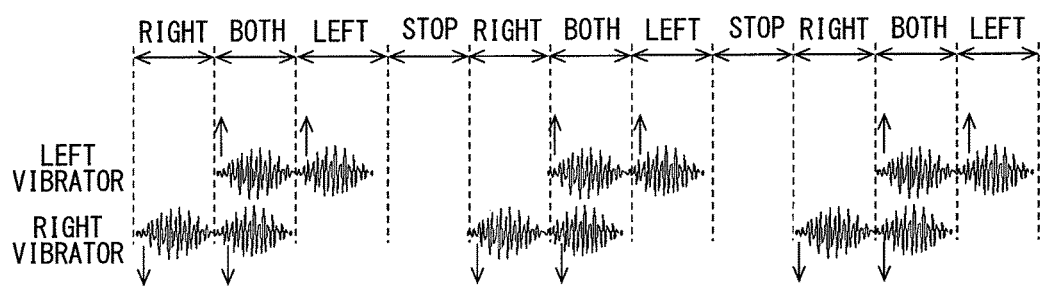
FIG. 8 is a view used to describe a left-rotation pattern of the first embodiment.

In the right-turn pattern shown in FIG. 5 and the right-rotation pattern shown in FIG. 7, state shift takes place repetitively more than once (for example, three times) in order of the left vibration state, the right-and-left vibration state, the right vibration state, and the right-and-left stopped state. In the left-turn pattern shown in FIG. 6 and the left-rotation pattern shown in FIG. 8, state shift takes place repetitively more than once (for example, three times) in order of the right vibration state, the right-and-left vibration state, the left vibration state, and the right-and-left stopped state. In the acceleration and deceleration pattern shown in FIG. 9, state shift takes place repetitively more than once (for example, three times) in order of the right-and-left vibration state by twice and the right-and-left stopped state by once.

In the respective drawings, upward arrows indicate that the vibration element is started to move from a right side when the vibrators 20 and 30 are vibrated. Meanwhile, downward arrows indicate that the vibration element is started to move from a left side when the vibrators 20 and 30 are vibrated. For example, in the right-turn pattern shown in FIG. 5, the left vibrator 30 and the right vibrator 20 are always started to move from the right side. In the left-turn pattern shown in FIG. 6, the left vibrator 30 and the right vibrator 20 are always started to move from the left side. In the right-rotation pattern shown in FIG. 7 and the left-rotation pattern shown in FIG. 8, the left vibrator 30 is always started to move from the right side while the right vibrator 20 is always started to move from the left side.

According to the present embodiment, the information provision device includes the left vibrator 30, the right vibrator 20, the control unit 71, and the pattern setting unit 72. When the right-turn related information is provided to the user, the vibration pattern is switched to the right-turn related pattern. When the left-turn related information is provided to the user, the vibration pattern is switched to the left-turn related pattern. The right-turn related pattern includes at least a pattern in which the vibration state shifts in order of the left vibration state, the right-and-left vibration state, and the right vibration state. The left-turn related pattern includes at least a pattern in which the vibration state shifts in order of the right vibration state, the right-and-left vibration state, and the left vibration state.

When the right-turn related information is provided, because state shift takes place in order of the left vibration state, the right-and-left vibration state, and the right vibration state, the user feels a vibration at the left hand first, followed by the both hands and the right hand. That is, the user feels as if the vibration propagated from the left hand to the right hand. The user can thus comprehend by tactile sense the right-turn related information being provided. Conversely, when the left-turn related information is provided, because state shift takes place in order of the right vibration sate, the right-and-left vibration state, and the left vibration state, the user feels a vibration at the right hand first, followed by the both hands and the left hand. That is, the user feels as if the vibration propagated from the right hand to the left hand. The user can thus comprehend by tactile sense the left-turn related information being provided.

Moreover, according to the present embodiment, shift of vibration states as above can achieve by using the two vibrators 20 and 30. Hence, the information provision device enables the user to comprehend the provided information by tactile sense by using fewer vibrators 20 and 30.

According to the present embodiment, the right-turn related pattern includes at least a pattern in which the vibration state shifts, repetitively by more than once, in order of the left vibration state, the right-and-left vibration state, the right vibration state, and the right-and-left stopped state. The left-turn related pattern includes at least a pattern in which the vibration state shifts, repetitively by more than once, in order of the right vibration state, the right-and-left vibration state, the left vibration state, and the right-and-left stopped state. Hence, the user can comprehend the provided information by tactile sense based on the vibration pattern with a higher reliability.

According to the present embodiment, the control unit 71 gradually increases amplitude of the left vibrator 30 when the left vibration state or the right-and-left vibration state is started, and gradually increases amplitude of the right vibrator 20 when the right vibration state or the right-and-left vibration state is started. When configured in the manner as above, in comparison with a case where vibrations in large amplitude are started abruptly, the user can know more easily by tactile sense whether a present vibration state is the left vibration state, the right-and-left vibration state, or the right vibration state.

According to the present embodiment, the control unit 71 controls the left vibrator 30 and the right vibrator 20 to concurrently start to increase amplitude when the right-and-left vibration state is started. When configured in the manner as above, in comparison with a case where the increase start time point is shifted between the vibrators 20 and 30, the user can know more easily by tactile sense that the present state is the right-and-left vibration state.

According to the present embodiment, the control unit 71 gradually reduces amplitude of the left vibrator when the left vibration state or the right-and-left vibration state is ended, and gradually reduces amplitude of the right vibrator when the right vibration state or the right-and-left vibration state is ended. When configured in the manner as above, in comparison with a case where vibrations at large amplitude are ended abruptly, the user can know more easily by tactile sense that state shift is taking place from the present vibration state to the following vibration state or to the right-and-left stopped state.

According to the present embodiment, the left vibrator 30 and the right vibrator 20 are disposed to have the vibration direction coinciding with the vehicle right-left direction in reference to the steering wheel 10 at the rotational position when the vehicle travels straight ahead. The control unit 71 controls the left vibrator 30 which is in stopped state to start the vibration from the right side in the left vibration state of the right-turn related pattern, and controls the right vibrator 20 which is in stopped state to start the vibration from the left side in the right vibration state of the left-turn related pattern.

In the vibration pattern transferring the right-turn related information, the state shift takes place in order of the left vibration state, the right-and-left vibration state, and the right vibration state. Thus, the user feels that a vibration has started from the right side at the left hand when the user feels the first left vibration state at the left hand. The user is thus more likely to feel as if the vibration propagated from the left hand to the right hand. Consequently, the user can comprehend, by tactile sense, the provided right-turn related information with a higher reliability. Conversely, in the vibration pattern transferring the left-turn related information, the state shift takes place in order of the right vibration state, the right-and-left vibration state, and the left vibration state, and the user feels that a vibration has started from the left side at the right hand when the user feels the first right vibration state at the right hand. The user is thus more likely to feel as if the vibration propagated from the right hand to the left hand. Consequently, the user can comprehend, by tactile sense, the provided left-turn related information with a higher reliability.

The vehicle of the present embodiment is equipped with the steering control unit 81 which autonomously controls a steering angle of the steering wheel 10, and the right-turn related informant and the left-turn related information give, respectively, a prior notice that the vehicle is taking a right turn and a prior notice that the vehicle is taking a left turn under an autonomous control executed by the steering control unit 81. When configured in the manner as above, the user can feel a vibration through the steering wheel 10 before the steering wheel 10 is rotated autonomously. Hence, a strange feeling the user may have when a traveling direction is changed autonomously by rotating the steering wheel 10 autonomously without a prior notice can be lessened. Moreover, because the user is given with a prior notice as to whether the vehicle is taking a right turn or a left turn, the user can feel safer with such a prior notice.

According to the present embodiment, the control unit 71 controls the right vibrator 20 which is in stopped state to start the vibration from the left side in the right vibration state of the right-turn related pattern, and controls the left vibrator which is in stopped state to start vibration from the right side in the left vibration state of the left-turn related pattern.

When configured in the manner as above, in the vibration pattern transferring the right-turn related information, the state shift takes place in order of the left vibration state, the right-and-left vibration state, and the right vibration state, and the user feels that a vibration has started from the left side at the right hand when the user feels the last right vibration state at the right hand. Consequently, in comparison with a case where a vibration has started from the right side contrary to the vibration starting from the left side as above, the user can know, by tactile sense, that information being provided is the information on a rotation of the steering wheel 10 with a higher reliability. Hence, the control described above is effective when the right-turn related pattern is the right-rotation pattern. Conversely, in the vibration pattern transferring the left-turn related information, the state shift takes place in order of the right vibration state, the right-and-left vibration state, and the left vibration state, and the user feels that a vibration has started from the right side at the left hand when the user feels the last left vibration state at the left hand. Consequently, in comparison with a case where a vibration has started from the left side contrary to the vibration starting from the right side as above, the user can know, by tactile sense, that information being provided is the information on a rotation of the steering wheel 10 with a higher reliability. Hence, the control described above is effective when the left-turn related pattern is the left-rotation pattern.

According to the present embodiment, the control unit 71 controls the right vibrator 20 which is in stopped state to start the vibration from the right side in the right vibration state of the right-turn related pattern, and controls the left vibrator 30 which is in stopped state to start vibration from the left side in the left vibration state of the left-turn related pattern.

When configured in the manner as above, in the vibration pattern transferring the right-turn related information, the state shift takes place in order of the left vibration state, the right-and-left vibration state, and the right vibration state. Thus, the user thus feels that a vibration has started from the right side at the right hand when the user feels the last right vibration state at the right hand. Consequently, in comparison with a case where the vibration has started from the left side contrary to the vibration starting from the right side as above, the user can know, by tactile sense, that the vehicle is headed to the right with a higher reliability. The control as above is thus effective when the right-turn related pattern is the right-turn pattern. Conversely, in the vibration pattern transferring the left-turn related information, the state shift takes place in order of the right vibration state, the right-and-left vibration state, and the left vibration state. Thus, the user feels that a vibration has started from the left side at the left hand when the user feels the last left vibration state at the left hand. Consequently, in comparison with a case where the vibration has started from the left side contrary to the vibration starting from the left side as above, the user can know, by tactile sense, that the vehicle is headed to the left with a higher reliability. The control as above is thus effective when the left-turn related pattern is the left-turn pattern.

According to the present embodiment, the pattern setting unit 72 switches the vibration pattern to the acceleration and deceleration pattern when the acceleration and deceleration information which is information on traveling at an accelerated speed or traveling at a decelerated speed of the vehicle is provided to the user. The acceleration and deceleration pattern includes at least a pattern in which the right-and-left vibration state is repeated by more than once at a predetermined interval. When configured in the manner as above, the user can know, by tactile sense, that information being provided is to call upon the user to accelerate or decelerate the vehicle. The user can also feel a vibration from the steering wheel 10 before a vehicle speed is controlled autonomously. Hence, a strange feeling the user may have when a vehicle speed is changed autonomously without a prior notice can be lessened. Moreover, because the acceleration and deceleration information is provided in a vibration pattern (acceleration and deceleration pattern) different from the right-turn related pattern and the left-turn related pattern, the acceleration and deceleration information can be provided in a manner distinguishable from the right-turn related information and the left-turn related information.

Second Embodiment

Figure 10:
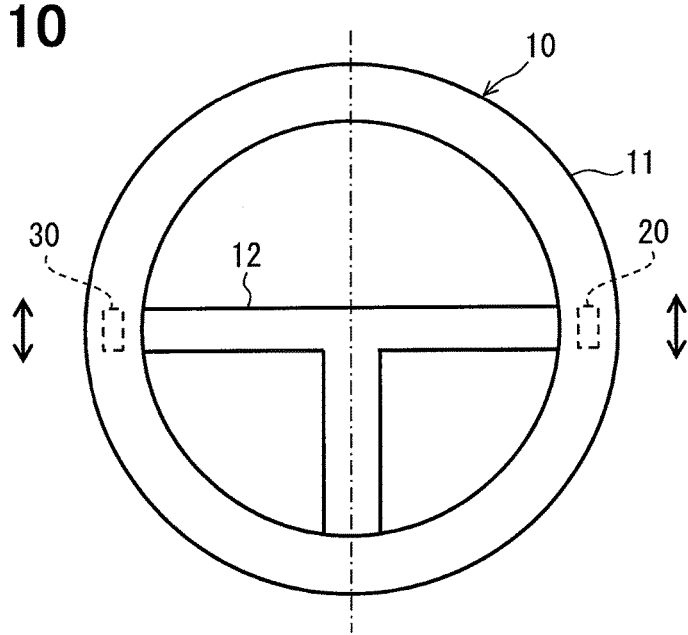
FIG. 10 is an electrical block diagram of an information provision device according to a second embodiment of the present disclosure.

In the first embodiment above, the vibrators 20 and 30 are disposed to have a vibration direction coinciding with the vehicle right-left direction in reference to the steering wheel 10 at the rotational position when the vehicle travels straight ahead. Alternatively, in the present embodiment shown in FIG. 10, the vibrators 20 and 30 are disposed to have a vibration direction coinciding with a top-bottom direction in reference to a steering wheel 10 at a rotational position when a vehicle travels straight ahead. To be more exact, the vibrators 20 and 30 are disposed to have a vibration direction (direction indicated by arrows in the drawing) perpendicular to a vehicle right-left direction and parallel to a plane including the wheel 11. When disposed in such a manner, acceleration information and deceleration information can be provided in distinguishable manner from each other in the present embodiment.

Figure 11:
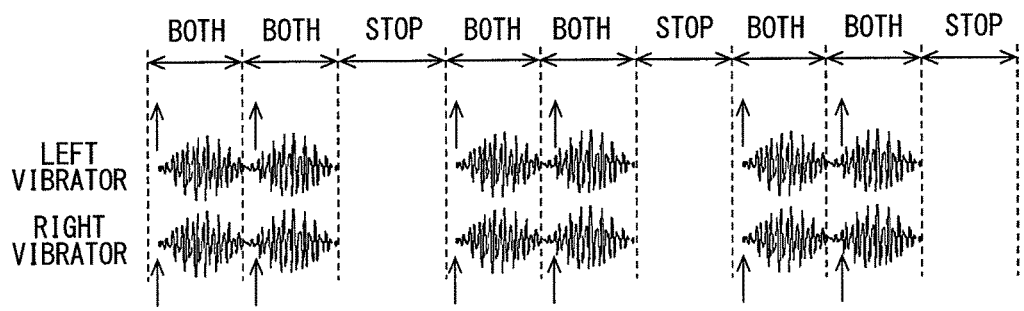
FIG. 11 is a view used to describe an acceleration pattern of the second embodiment.
Figure 12:
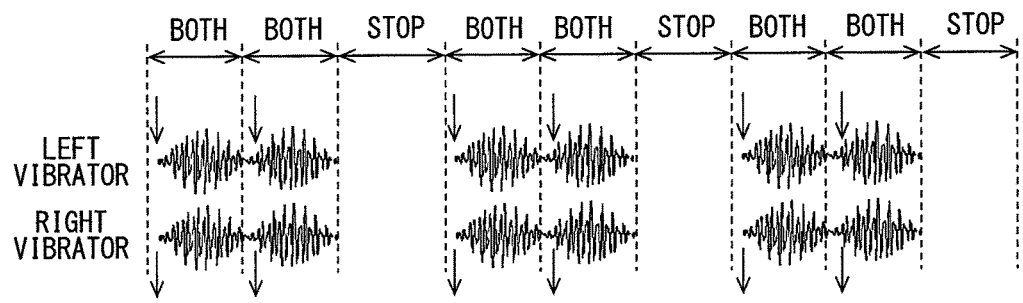
FIG. 12 is a view used to describe a deceleration pattern of the second embodiment.

More specifically, a vibration pattern is switched to an acceleration pattern shown in FIG. 11 or to a deceleration pattern shown in FIG. 12. Upward arrows in FIG. 11 indicate that a vibration element is started to move from an upper side when the vibrators 20 and 30 are vibrated. Downward arrows in FIG. 12 indicate that the vibration element is started to move from a lower side when the vibrators 20 and 30 are vibrated.

In the acceleration pattern, both of a left vibrator 30 and a right vibrator 20 are started to vibrate from the upper side. In the deceleration pattern, both of the left vibrator 30 and the right vibrator 20 are started to vibrate from the lower side.

When configured in the manner as above, a user can know, by tactile sense, that information being provided is information calling upon the user to accelerate or decelerate the vehicle or advance information giving a prior notice that a vehicle speed is to be changed by an autonomous control. Moreover, a direction from which the vibration element is started to move is set oppositely when the acceleration information is provided and when the deceleration information is provided. Consequently, the acceleration information and the deceleration information can be provided in distinguishable manner from each other.

Third Embodiment

Figure 13:
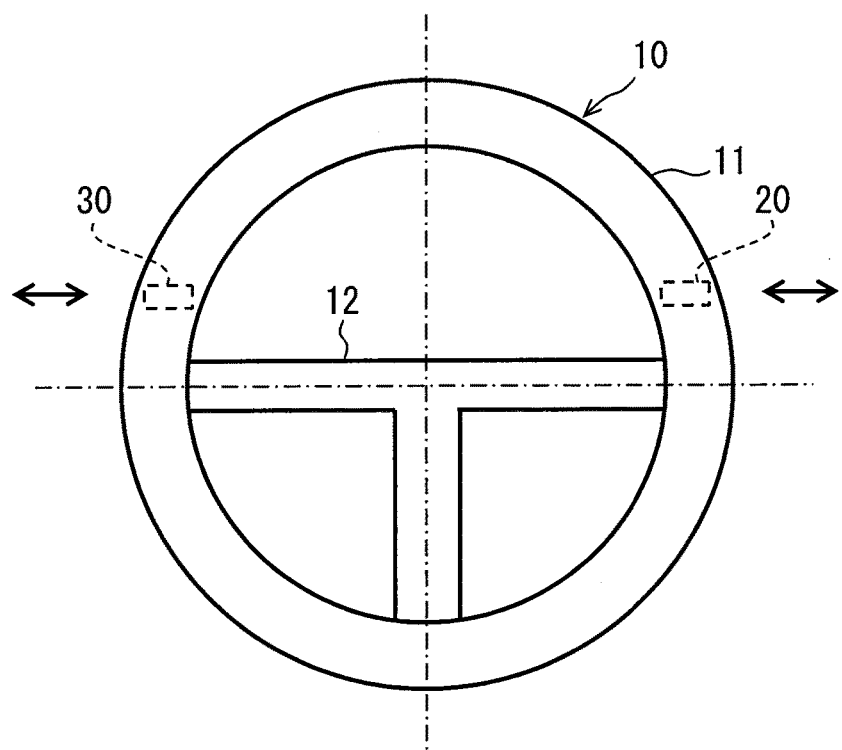
FIG. 13 is an electrical block diagram of an information provision device according to a third embodiment of the present disclosure.

In the first embodiment and the second embodiment above, the vibrators 20 and 30 are disposed on a virtual line passing a rotation center of the steering wheel 10 and extending horizontally in the vehicle right-left direction (see alternate long and short dash lines) in reference to the steering wheel 10 at the rotational position when the vehicle travels straight ahead. In the present embodiment shown in FIG. 13, the vibrators 20 and 30 are disposed at positions displaced from the virtual line in reference to a steering wheel at a rotational position when the vehicle travels straight ahead. More specifically, the vibrators 20 and 30 are disposed on an upper side of the virtual line.

Even when the vibrators 20 and 30 are disposed as above, a user can comprehend by tactile sense a content of information which is provided by switching of the vibration patterns. The switching of the vibration patterns is carried out according to the information to be provided.

Other Embodiments

While the above has described preferred embodiments of the present disclosure, it should be appreciated that the present disclosure is not limited to the embodiments described above and can be modified in various manners as described below by way of example. Besides a combination of portions explicitly described as being feasible in the respective embodiments above, portions of the embodiments can be combined even when feasibility is not explicitly described unless a trouble arises from such a combination.

In the respective embodiments above, the left vibration state is defined as a state in which the left vibrator 30 is vibrated at the vibration intensity as high as or higher than the predetermined value while the right vibrator 20 is in vibration stopped state. Alternatively, the left vibration state may be defined as a state in which the left vibrator 30 is vibrated at vibration intensity as high as or higher than the predetermined value while the vibrator 20 is vibrated at a vibration intensity lower than the predetermined value. In short, under a condition that the left vibrator 30 vibrates at a higher vibration intensity than the right vibrator 20, the vibration intensity of the right vibrator can be properly set. Thus, under a condition that the left vibrator 30 vibrates at the higher vibration intensity than the right vibrator 20, the left vibrator 30 is not necessarily to be set in the vibration stopped state.

In the respective embodiments above, the right-rotation information and the left-rotation information related to an autonomous rotation of the steering wheel 10, respectively, and the right-turn information and the left-turn information related to the turn-by-turn control, respectively, are referred to as the right-turn related information and the left-turn related information. Alternatively, information calling upon the driver to change lanes or advance information giving a prior notice that the vehicle is going to change lanes by autonomously rotating the steering wheel 10 under the autonomous driving may also be referred to as the right-turn related information and the left-turn related information.

In the respective embodiments above, the vibration intensity is increased gradually and the vibration intensity s reduced gradually in a period of the left vibration state, a period of the right vibration state, and a period of the right-and-left vibration state. Alternatively, the vibration intensity may be constant in each period. In such a case, it is preferable to vibrate the vibrators 20 and 30 twice intermittently at constant vibration intensity to let the user feel as if the vibration intensity pulsated twice by increasing and decreasing and again increasing and decreasing.

In the respective embodiments above, the vibration pattern in which the state shift takes place in order of the right vibration state, the right-and-left vibration state, and the left vibration state is repeated more than once (for example, three times). Alternatively, the vibration pattern may be performed only once.

In the respective embodiments above, a single vibrator 20 and a single vibrator 30 are disposed, respectively on the left side and the right side of the steering wheel 10. However, more than one vibrator may be disposed on each of the left and the right sides of the steering wheel 10.

Means and/or functions provided by the steering ECU 70 (control unit) can be provided by a software program recorded in a solid storage medium and a computer running the software program, software program alone, hardware circuit alone, or a combination of the foregoing elements. For example, in a case where the control unit is provided by a hardware circuit, the control unit can be provided by a digital circuit or an analog circuit including a large number of logic circuits.

While the disclosure has been described with reference to preferred embodiments thereof, it is to be understood that the disclosure is not limited to the preferred embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The invention claimed is:

1. An information provision device, comprising:
   a left vibrator disposed at a left portion of a steering wheel of a vehicle when viewed from a front of the steering wheel;
   a right vibrator disposed at a right portion of the steering wheel of the vehicle when viewed from the front of the steering wheel;
   a control unit controlling the left vibrator and the right vibrator to vibrate at a vibration intensity which varies according to a predetermined pattern; and
   a pattern setting unit setting, as the predetermined pattern, a right-turn related pattern when right-turn related information indicating information related to a right turn of the vehicle is provided to a user, and the pattern setting unit setting, as the predetermined pattern, a left-turn related pattern when left-turn related information indicating information related to a left turn of the vehicle is provided to the user,
   wherein:
   a vibration state in which a vibration intensity of the left vibrator is equal to or higher than a predetermined value and a vibration intensity of the right vibrator is lower than the predetermined value or a vibration of the right vibrator is stopped is defined as a left vibration state;
   a vibration state in which the vibration intensity of each of the left vibrator and the right vibrator is equal to or higher than the predetermined value is defined as a right-and-left vibration state;
   a vibration state in which the vibration intensity of the right vibrator is equal to or higher than the predetermined value and the vibration intensity of the left vibrator is lower than the predetermined value or a vibration of the left vibrator is stopped is defined as a right vibration state;
   the right-turn related pattern includes at least a pattern in which the vibration state of each of the left vibrator and the right vibrator shifts in order of the left vibration state, the right-and-left vibration state, and the right vibration state; and
   the left-turn related pattern includes at least a pattern in which the vibration state of each of the left vibrator and the right vibrator shifts in order of the right vibration state, the right-and-left vibration state, and the left vibration state.

2. The information provision device according to claim 1, wherein:
   a state in which both of the left vibrator and the right vibrator are stopped from vibrating is defined as a right-and-left stopped state;
   the right-turn related pattern includes at least a pattern in which the vibration state of each of the left vibrator and the right vibrator repetitively shifts in order of the left vibration state, the right-and-left vibration state, the right vibration state, and the right-and-left stopped state by more than once; and
   the left-turn related pattern includes at least a pattern in which the vibration state of each of the left vibrator and the right vibrator repetitively shifts in order of the right vibration state, the right-and-left vibration state, the left vibration state, and the right-and-left stopped state by more than once.

3. The information provision device according to claim 1, wherein:
   the control unit gradually increases an amplitude of the left vibrator when the left vibration state or the right-and-left vibration state is started; and
   the control unit gradually increases an amplitude of the right vibrator when the right vibration state or the right-and-left vibration state is started.

4. The information provision device according to claim 3, wherein the control unit concurrently starts to gradually increase the amplitude of the left vibrator and the amplitude of the right vibrator when the right-and-left vibration state is started.

5. The information provision device according to claim 1, wherein:
the control unit gradually reduces the amplitude of the left vibrator when the left vibration state or the right-and-left vibration state is ended; and
the control unit gradually reduces the amplitude of the right vibrator when the right vibration state or the right-and-left vibration state is ended.

6. The information provision device according to claim 1, wherein:
each of the left vibrator and the right vibrator is disposed to have a vibration direction coinciding with a vehicle right-left direction when the steering wheel is in a rotating state during a straight traveling of the vehicle;
in the left vibration state of the right-turn related pattern, the control unit controls the left vibrator which is in a stopped state to start the vibration from a right side; and
in the right vibration state of the left-turn related pattern, the control unit controls the right vibrator which is in a stopped state to start the vibration from a left side.

7. The information provision device according to claim 1, wherein:
the vehicle is equipped with a steering control unit executing an autonomous control for controlling a steering angle of the steering wheel; and
the right-turn related information provides a prior notice about a right turn of the vehicle when the vehicle is under the autonomous control executed by the steering control unit, and the left-turn related information provides a prior notice about a left turn of the vehicle when the vehicle is under the autonomous control executed by the steering control unit.

8. The information provision device according to claim 7, wherein:
each of the left vibrator and the right vibrator is disposed to have a vibration direction coinciding with a vehicle right-left direction when the steering wheel is in a rotating state during a straight traveling of the vehicle;
in the right vibration state of the right-turn related pattern, the control unit controls the right vibrator which is in a stopped state to start the vibration from a left side; and
in the left vibration state of the left-turn related pattern, the control unit controls the left vibrator which is in a stopped state to start the vibration from a right side.

9. The information provision device according to claim 1, wherein:
each of the left vibrator and the right vibrator is disposed to have a vibration direction coinciding with a vehicle right-left direction;
in the right vibration state of the right-turn related pattern, the control unit controls the right vibrator which is in a stopped state to start the vibration from a right side; and
in the left vibration state of the left-turn related pattern, the control unit controls the left vibrator which is in a stopped state to start the vibration from a left side.

10. The information provision device according to claim 1, wherein:
the pattern setting unit sets, as the predetermined pattern, an acceleration pattern when acceleration information indicating information related to an accelerated traveling of the vehicle is provided to the user;
the pattern setting unit sets, as the predetermined pattern, a deceleration pattern when deceleration information indicating information related to a decelerated traveling of the vehicle is provided to the user; and
each of the acceleration pattern and the deceleration pattern includes at least a pattern in which the right-and-left vibration state is repeated by more than once at a predetermined interval.

\* \* \* \* \*